United States Patent [19]
Centofanti

[11] 3,806,070

[45] Apr. 23, 1974

[54] PARACHUTE

[76] Inventor: Armando P. Centofanti, 2812 Newbern Cir., Youngstown, Ohio 44502

[22] Filed: Aug. 9, 1971

[21] Appl. No.: 170,043

[52] U.S. Cl............................ 244/145, 244/146
[51] Int. Cl...................... B64d 17/02, B64d 17/72
[58] Field of Search ............ 244/145, 146, 152, 142

[56] References Cited
UNITED STATES PATENTS

| 1,855,320 | 4/1932 | Schwabek | 244/146 X |
| 3,284,032 | 11/1966 | Eckstrom | 244/145 |
| 3,127,137 | 3/1964 | Downing | 244/146 X |
| 1,378,198 | 5/1921 | Smith | 244/152 |
| 1,826,245 | 10/1931 | Hammerle | 244/146 |
| 2,111,886 | 3/1938 | Capel | 244/146 |
| 2,575,387 | 11/1951 | Kluglein et al. | 244/152 |
| 1,931,160 | 10/1933 | Knight | 244/145 |
| 3,350,040 | 10/1967 | Sims et al. | 244/145 |

FOREIGN PATENTS OR APPLICATIONS

| 281,881 | 12/1927 | Great Britain | 244/145 |
| 496,635 | 11/1919 | France | 244/145 |

Primary Examiner—Trygve M. Blix
Assistant Examiner—Charles E. Frankfort
Attorney, Agent, or Firm—Webster B. Harpman

[57] ABSTRACT

A parachute of novel cylindrical shape having an upper end closure is disclosed in which the lower annular edge of the cylindrical shaped parachute is provided with an inflatable tube for insuring opening of the same and in which a control cord is attached to the central area of the upper end closure enabling the configuration of the cylindrical parachute to be distorted and flattened in operation to provide increased control of the rate of descent of the person or article supported by the parachute.

1 Claim, 2 Drawing Figures

PATENTED APR 23 1974  3,806,070

INVENTOR.
ARMANDO P. CENTOFANTI
BY W.B. Harfsman
ATTORNEY

PARACHUTE

BACKGROUND OF THE INVENTION

1. Field of the Invention

This invention relates to parachutes of the type used for lowering heavy articles to the ground as from transport planes in military operations and the like.

2. Description of the Prior Art

Prior parachute constructions have generally consisted of rather wide area shallow depth structures, the cross sectional shape of the same defining a relatively flat arcuate shape with a multitude of support cards attached to the annular edge thereof. Proposals for attaching smaller parachute constructions to the center of conventional parachutes have been made, see for example, U. S. Pat. No. 2,784,927 and means have been proposed for reducing the diameter of the open lower end of parachutes; see for example, U.S. Pat. No. 2,384,127.

This invention eliminates the dependency upon shallow relatively wide parachute structures and substitutes a relatively tall cylindrical construction closed at the top which results in improved stability of a load supported thereby.

SUMMARY OF THE INVENTION

A parachute consisting of a cylindrical member of lightweight easily distortable fabric or film material closed at its upper end and open at its lower end and wherein the proportion of height is at least equal to the width thereof as means for altering the configuration of its upper end and sides by moving the central portion of the upper end closure downwardly within its cylindrical shape and incorporates an inflatable tube about its open lower end to insure opening thereof as upon inflation of said tube.

DESCRIPTION OF THE PREFERRED EMBODIMENT

Figure 2:
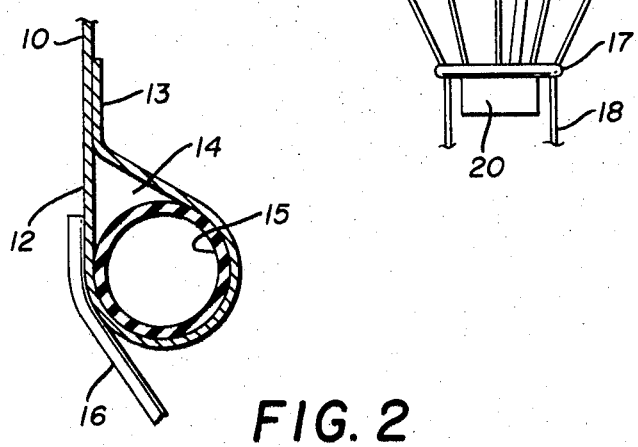
FIG. 2 is a vertical section on line 2—2 of FIG. 1 in enlarged detail.

In the form of the invention chosen for illustration the parachute consists of a cylindrical body member 10 having an upper end closure 11, the cylindrical body member 10 and the upper end closure 11 being formed of thin lightweight distortable fabric such as nylon or plastic film such as polyvinyl chloride. The lower end 12 of the cylindrical body member 10 is annular and seamed circumferentially as at 13 as best seen in FIG. 2 of the drawings with the seamed area defining a hem 14 enclosing an inflatable thin air impervious tube 15. Guide lines 16 extend from the lower end 12 of the parachute. Two A support members 17 to which a person or an article to be supported by the parachute may be suspended as by lines 18. A flexible hose 19 communicates with the tube 15 and extends to the support member 17 where it communicates with a release device and a source of compressed air or compressed gas 20.

Figure 1:
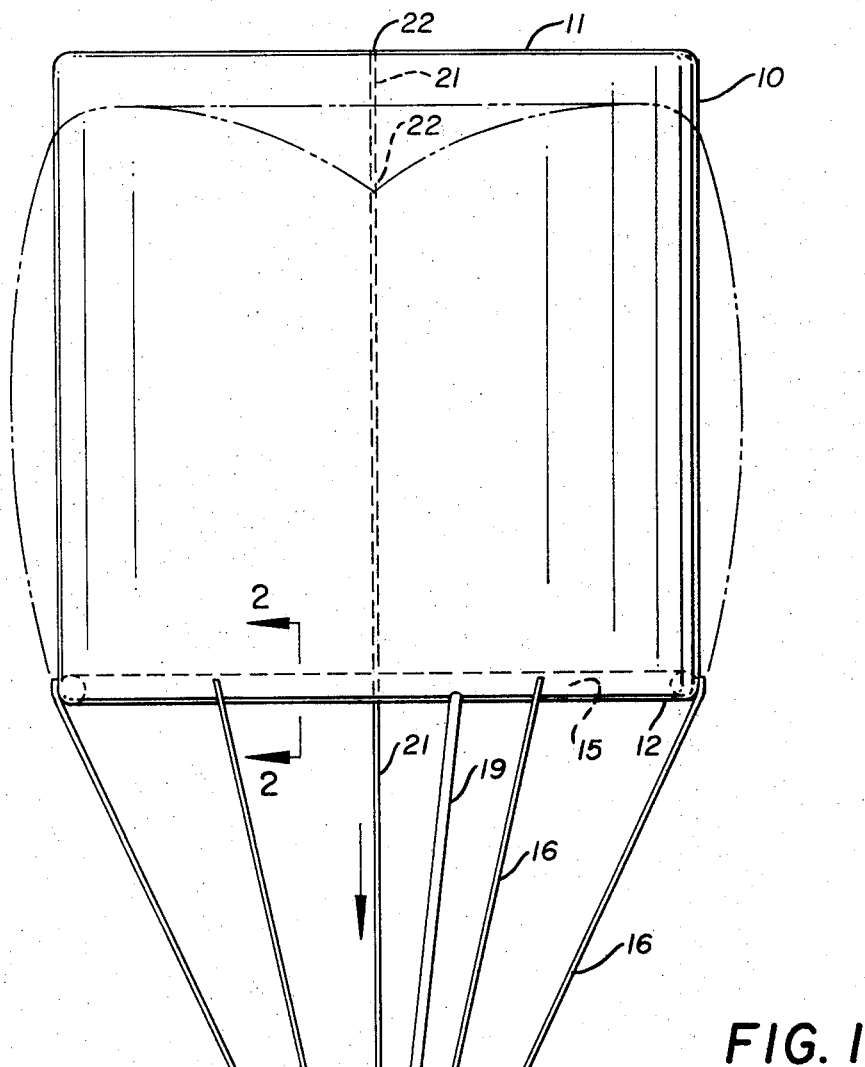
FIG. 1 is a perspective view of the parachute with broken lines indicating an alternate distorted position thereof.

Still referring to FIG. 1 of the drawings, it will be seen that a control cord 21 extends upwardly from the support member 17 to a central point 22 on the upper end closure 11 where it is secured and broken lines in FIG. 1 of the drawings indicates the distortion and shape of the parachute that occurs when the same is in supporting position in the air and the control cord 21 is pulled downwardly. The upper end closure 11 assumes an inverted conical shape and the side walls of the cylindrical body member 10 expand outwardly which shape results in a substantial change in air circulation within the area defined by the parachute as compared with its normal shape as shown in solid lines in FIG. 1 of the drawings.

OPERATION

At such time as the parachute disclosed herein is in operation supporting a person or an article in the air, the rate of descent will be found to be relatively slow as compared with parachute constructions heretofore known in the art. It is believed that this relatively slow rate of descent is occasioned by the cylindrical shape of the parachute and the fact that it entraps a considerable volume of air and that the flow of this air may be controlled by distorting the shape, by means of the control cord 21 heretofore described.

In supporting relation in the air, actuation of the control card depresses the central area of the upper end closure 11 and results in a circulation of air upwardly of the center of the cylindrical body member and downwardly along the curving outer sides thereof where it is spilled out or forced out around the annular lower edge, thus affecting the rate of descent and contributing to the control of the same and the directional descent with respect to sideward travel.

The above described structure is relatively easy to fabricate. It packs in the same type of parachute pack conventionally employed and it may be used with or without the inflatable tube on its lower end as it will open without it and its opening is insured with it.

Although but one embodiment of the present invention has been illustrated and described, it will be apparent to those skilled in the art that various changes and modifications may be made therein without departing from the spirit of the invention, having thus described my invention, what I claim is:

1. A parachute consisting of a cylindrical body member the height of which is at least equal to the width thereof and having an upper end closure and a lower annular edge defining a circular opening, guide lines secured to the lower annular edge and depending therefrom, a support member and a control cord attached to the upper end closure centrally thereof and depending through said parachute and with said guide lines extending to said support member.

* * * * *